United States Patent

Shen et al.

[11] Patent Number: 5,990,232
[45] Date of Patent: Nov. 23, 1999

[54] STABILIZERS FOR POLYMER POLYOLS

[75] Inventors: Jianzhong Shen; Kenneth G. McDaniel, both of West Chester, Pa.; John E. Hayes, Gouvieux, France; Uli B. Holeschovsky, Chester Springs, Pa.; Harry R. Hinney, Cross Lanes, W. Va.

[73] Assignee: ARCO Chemical Technology, L.P., Greenville, Del.

[21] Appl. No.: 08/918,207

[22] Filed: Aug. 25, 1997

[51] Int. Cl.⁶ .................................................. C08K 5/06
[52] U.S. Cl. ........................................... 524/762; 568/616
[58] Field of Search .............................. 568/616; 524/762

[56] References Cited

U.S. PATENT DOCUMENTS

| | | |
|---|---|---|
| 4,454,255 | 6/1984 | Ramlow et al. . |
| 4,472,560 | 9/1984 | Kuyper et al. ........................ 568/620 |
| 5,114,619 | 5/1992 | Heuveisland ............................ 568/618 |
| 5,196,476 | 3/1993 | Simroth . |
| 5,196,496 | 3/1993 | Galimberti et al. ..................... 526/160 |
| 5,777,177 | 7/1998 | Pazo ........................................ 568/679 |

FOREIGN PATENT DOCUMENTS

| | | |
|---|---|---|
| 5-209052 | 7/1992 | Japan . |
| 6-228247 | 8/1994 | Japan . |

*Primary Examiner*—John M. Cooney, Jr.
*Attorney, Agent, or Firm*—Jonathan L. Schuchardt

[57] ABSTRACT

Unique, well defined polyethers containing both hydroxyl-functionality and unsaturation-functionality are prepared by oxyalkylating an unsaturated monomer having at least two free carboxylic acid groups in the presence of an effective amount of a double metal cyanide complex catalyst, optionally, when necessary, in the presence of a free radical polymerization inhibitor. The resulting polyethers are eminently suitable for such uses as polymer polyol stabilizers or stabilizer precursors, and both in situ and ex situ impact modifiers for thermoplastics.

28 Claims, No Drawings

STABILIZERS FOR POLYMER POLYOLS

TECHNOLOGICAL FIELD

The present invention relates to the field of polymer polyols. More particularly, the subject invention pertains to a process for the preparation of polymer polyol stabilizers, and to polymer polyols prepared therefrom. Polymer polyols prepared by in situ polymerization of vinyl monomers in a polyether polyol, polyester polyol, or polyetherester polyol in the presence of suitable stabilizers, are useful in producing a variety of polyurethane products.

DESCRIPTION OF THE RELATED ART

Polyurethane products such as polyurethane foams and elastomers are generally prepared by the reaction of a di- or polyisocyanate with a hydroxyl-functional polyoxyalkylene polyether polyol. To provide higher strength and load bearing properties, polyether polyols containing vinyl polymer dispersions were developed. Early "polymer polyols" were produced in situ in polyether "base" or "carrier" polyols, generally employing acrylonitrile and/or styrene as polymerizable vinyl monomers. An active, free radical polymerization initiator was utilized to promote vinyl polymerization. These early polymer polyols were generally of high viscosity and low solids content and were often highly colored as well. Attempts to increase solids content led to yet higher viscosity and "seedy" polyols with numerous large polymer particles.

It was found that higher solids polymer polyols of lower viscosity could be produced by adding polyols modified to contain reactive unsaturation. Conventional polyether polyols contain relatively large amounts of unsaturation due to oxyalkylation employing basic catalysts. During base-catalyzed oxyalkylation, propylene oxide continually rearranges to allyl alcohol, producing considerable amounts of allylic-unsaturation-containing monols, at times as much as 40 mol percent of total polyol. However, the special stability associated with the allyl group makes allylic unsaturation much less reactive than other types of unsaturation such as vinyl unsaturation. As a result of the low activity of the allylic unsaturation in conventionally catalyzed polyether polyols, the free radical initiators used to initiate polymerization in situ, tended to generate polyol free radicals in a random manner by abstraction of hydrogen atoms from the polyol backbone, even when the molecule contained allylic unsaturation. Thus, vinyl polymerization was initiated randomly along the backbone also, forming ill-defined and inefficient stabilizers.

Further improvements in the manufacture of polymer polyols were the use of preformed stabilizers, as disclosed in Simroth U.S. Pat. No. 5,196,476, and the use of polyether "macromers" containing reactive unsaturation as disclosed in U.S. Pat. No. 4,454,255. Both these rather different processes employ reaction of hydroxyl functional polyether polyols with a moiety containing both hydroxyl-reactive functionality and reactive unsaturation to form a stabilizer per se or a stabilizer precursor.

Unsaturated reactive moieties such as isocyanatoethylmethacrylate, α,α-dimethyl-m-isopropenylbenzyl isocyanate (TMI), ethylfumaryl chloride, and the like have been used to directly introduce reactive functionality onto the polyether. The acrylate-functional products have very limited shelf life, and must be prepared just prior to vinyl polymer polymerization. Reactive species such as ethylfumaryl chloride and TMI are relatively expensive. Maleic anhydride may be used to supply reactive unsaturation, but it is then necessary to isomerize the relatively less active maleate-unsaturation to the more highly active fumarate (trans) isomer, and also to cap the remaining acid functionality of the polyol/fumarate half ester with additional alkylene oxide, thus extending processing time and expense.

The use of reactive species such as those described above in the processes of the '476 and '255 patents have increased solids content to the vicinity of 50 weight percent with reasonable viscosity. Further improvements are desired, however. For example, the polydispersity of conventionally base-catalyzed polyether polyols is high. These polyols contain considerable quantities of low molecular weight monols. Thus, the stabilizers produced by reaction of the polyol with an unsaturated, hydroxyl-reactive species also span a wide molecular weight range. Stabilizer molecules of low molecular weight are very inefficient stabilizers, and thus, a large proportion of stabilizer must be used to provide the desired stabilizing effect. Moreover, the stabilizer viscosity tends to be high. This high viscosity translates, in minor part, to higher viscosity in the final polymer polyol product.

In Japanese Kokai H5-209052 (1993), impact modifiers for use in polyvinylchloride are disclosed. These impact modifiers are prepared by further polyoxypropylation of unsaturated polyoxyalkylene oligomers, the oligomers having been prepared from unsaturated alcohols such as allyl alcohol and ω-hydroxyalkylvinyl ethers. This second polyoxypropylation takes place in the presence of a double metal cyanide complex catalysts. However, the products are highly viscous (2200 cps at 75° C.) and yellow in color, the level of DMC catalysis-derived unsaturation is higher than desired, expected to be in the range of 0.015 meq/g to 0.025 meq/g; and the DMC-catalyzed oxypropylation is performed on previously polyoxyalkylated oligomers having molecular weights in the range of 1100 Da to 2000 Da. The use of such high molecular weight starter molecules significantly limits the build ratio obtainable in the polyoxyalkylation reactor.

The Japanese Kokai reference also discloses impact modifiers prepared by reacting unsaturated carboxylic acid derivatives with monofunctional polyether polyols. Thus, modifiers were prepared, respectively, by reacting acryloyl chloride or fumaryl chloride with n-butanol initiated polyoxypropylene monols. Unsaturated acid chlorides such as these are expensive and often unstable (highly reactive). Moreover, the process is incapable of preparing macromers which retain their hydroxyl functionality.

It would be desirable to prepare better defined reactive unsaturation-containing species with retained hydroxyl functionality which can be used to prepare a wide variety of polymer polyols. It would be further desirable to be able to prepare polymer polyol stabilizers in shorter time and at less cost. It would be yet further desirable to prepare polymer polyol stabilizers which themselves have low viscosity. The stabilizers thus prepared may be used to manufacture polymer polyols, or in other applications where polyethers having both hydroxyl functionality and reactive unsaturation are necessary or desirable.

SUMMARY OF THE INVENTION

It has now been surprisingly discovered that well defined, reactive unsaturation-containing species may be prepared by oxyalkylating an oxyalkylatable molecule containing both reactive unsaturation as well as two or more free carboxylic acid groups, in the presence of a double metal cyanide complex catalyst, optionally in the presence of a vinyl polymerization inhibitor. The reactive unsaturation-containing polyol derivatives are useful in all types of polyether polymer production, including both macromer-based and preformed stabilizer-based polymer polyol production processes. The products are also useful in other applications such as starters for the preparation of impact-modified polymers such as styrene, ABS, and the like, or in the preparation of tougheners which may be blended with such thermoplastics.

DESCRIPTION OF THE PREFERRED EMBODIMENT

The subject invention process involves the oxyalkylation of a reactive-unsaturation-containing, di- or polycarboxylic acid initiator molecule with one or more alkylene oxides in the presence of a double metal cyanide complex catalyst. Preferred initiators are maleic acid, fumaric acid, itaconic acid, 1,4-cyclohexa-2-ene dicarboxylic acid, methylmaleic acid, 1,4-butynedicarboxylic acid, and the like. Cyclic anhydrides such as maleic anhydride are useful if the polymerization conditions allow ring opening to provide a molecule which is oxyalkylatable in the same manner as the parent dicarboxylic acid. Such anhydrides are also considered di- or polycarboxylic acid initiators as that term is used herein. The initiator molecules may have more than one site of reactive unsaturated functionality. The preferred molecular weight of the initiator molecule should be below 500 Da, and more particularly below 300 Da.

By the term "reactive unsaturated functionality is meant ethylenic or ethylynic (acetylenic) unsaturation capable of undergoing free radical induced addition polymerization. While reactive unsaturation displaying greater reactivity than the allyl group is desirable for the preparation of polymer polyol stabilizers, allylic unsaturation and other unsaturation of similar or lower reactivity may be useful when the novel products of the subject invention are contemplated for uses other than as polymer polyol stabilizers, i.e. as impact modifiers, grafted dispersing aids, coatings, and the like. Generally, however, the reactive unsaturation is a more reactive unsaturation such as maleate, and particularly fumarate.

Preferably, the stabilizers correspond to mixtures containing one or more of the formula: R $-(X_p-\{-(R^2-O)_n-H\}_m)_o$ where o is an integer from 2 to 4, preferably 2 to 3, and in particular 2; n is an integer such that the average value of n×o is from about 10 to about 500, more preferably 15 to about 400, and in particular about 20 to about 250; p is 0 or 1; $R^2$ is alkylene or substituted alkylene, i.e. $C_{2-30}$ alkylene optionally substituted by groups such as halo, i.e. fluoro, chloro, or bromo; alkoxy, i.e. methoxy, or ethoxy nitro; cyano; hydroxyalkyl, and the like; X is a linking group selected from

and the like, wherein the number of

linking groups per molecule is at least two; and m is 1 for singly oxyalkylatable linking group precursors and 2 for doubly oxyalkylatable linking group precursors; wherein $R^3$ is $C_{1-8}$ lower alkyl, optionally substituted by the same substituents as optional for R; and wherein R is a $C_{2-30}$ hydrocarbon containing at least one site of ethylenic or ethylynic (acetylenic) unsaturation, optionally substituted by non-reactive groups such as halo, alkoxy, cyano, and the like, and optionally containing interspersed heteroatoms, particularly O, S and/or N. R may be aliphatic, cycloaliphatic, aromatic, arylaliphatic, heteroaromatic, and the like, provided that when R is aromatic or heteroaromatic, the aromatic ring structure is substituted by at least one ethylenic or ethylynic radical-containing group.

The alkylene oxide employed in oxyalkylating the "starter" or "initiator" may be any alkylene oxide polymerizable with double metal cyanide catalysts. Examples include ethylene oxide, propylene oxide, 1,2- and 2,3-butylene oxide, $C_{6-30}$ α-olefin oxides, oxetane, glycidol, and halogenated alkylene oxides. Preferred are propylene oxide and ethylene oxide. Mixtures of more than one alkylene oxide may be used, for example mixtures of propylene oxide and ethylene oxide. Alkylene oxides and their mixtures may be polymerized onto the initiator molecule in one or more stages, to produce homopolymers, block copolymers, random copolymers, block random copolymers, and the like. "Copolymer" in the present application includes "terpolymer" and mixtures of more than three alkylene oxides as well. Other comonomers may be polymerized along with the alkylene oxide. Examples of copolymerizable monomers include those disclosed in U.S. Pat. Nos. 3,278,457; 3,278,458; 3,404,109; 3,538,043; 3,900,518; 3,941,849; 4,472,560; 5,145,833; 5,145,883; and 5,223,583 which are herein incorporated by reference. Glycidol is a particularly preferred copolymerizable monomer, which may be used to introduce additional hydroxyl functionality over that obtained by the use of traditional alkylene oxides such as propylene oxide.

Suitable double metal cyanide catalysts are by now well known to those skilled in the art. Double metal cyanide complex catalysts are non-stoichiometric complexes of a low molecular weight organic complexing agent and optionally other complexing agents with a double metal cyanide salt, e.g. zinc hexacyanocobaltate. Exemplary double metal cyanide complex catalysts ("DMC catalysts") include those suitable for preparation of low unsaturation polyoxyalkylene polyether polyols as disclosed in U.S. Pat. Nos. 3,427,256; 3,427,334; 3,427,335; 3,829,505; 4,472,560; 4,477,589; and 5,158,922. Preferably however, the DMC catalysts used are those capable of preparing "ultra-low" unsaturation polyether polyols, particularly homopolyoxypropylene polyether polymers and polyoxypropylene/polyoxyethylene random polyether copolymer polyols. The polyoxyalkylene polymers produced by the catalysts typically have levels of unsaturation (other than the purposefully introduced unsaturation of the subject invention starter molecules) less than about 0.010 meq/g as measured by ASTM D-2849-69, "TESTING OF URETHANE FOAM POLYOL RAW MATERIALS". Such catalysts are disclosed in U.S. Pat. Nos. 5,470,813 and 5,482,908, and 5,545,601, which are herein incorporated by reference. The use of double metal cyanide complex catalysts of other than the ultra-low unsaturation producing type have been found to produce erratic results.

Oxyalkylation conditions may be varied to suit the particular reactive unsaturation-containing initiator, alkylene oxide, and the like. For example, with liquid or low melting initiators, oxyalkylation may be effected by oxyalkylating neat, while with these same initiators or with solid initiators of higher melting point, oxyalkylation in solution or suspension in inert organic solvent may be desired. Suitable solvents include aprotic polar solvents such as dimethylsulfoxide, dimethylacetamide, N-methylpyrollidone, dimethylformamide, acetonitrile, methylene chloride, and especially the more volatile hydrocarbon solvents such as benzene, toluene, ethylbenzene, cyclohexane, petroleum ether, methylethylketone, cyclohexanone, diethylether, tetrahydrofuran, and the like. It has been found that certain difficulty soluble initiators may be initially oxyalkylated in suspension in organic liquid such as toluene, and following oxyalkylation with from 1 to 4 mols of alkylene oxide, will form soluble reaction products which can be further oxyalkylated in solution.

Oxyalkylation temperatures and pressures are conventional. Temperatures may range from room temperature or below to c.a. 150° C. or higher. Preferably, temperatures in the range of 70° C. to 140° C. are used, more preferably about 90° C. to about 135° C. With ultra-low unsaturation-producing DMC catalysts, it has been found effective to oxyalkylate at lower than normal temperatures, i.e. temperatures in the range of 60° C. to 90° C. These lower temperatures may be used to avoid vinyl polymerization and gelling, while still providing high reaction rates due to the high catalyst activity. Alkylene oxide pressure is adjusted to maintain a suitable reaction rate, consistent with the ability of the process system to remove heat from the reactor. Pressures from 5 psig or lower to about 90 psig are useful. A pressure of 8–15 psig, preferably 10–12 psig when employing propylene oxide, ethylene oxide, or mixtures of these alkylene oxides is preferred.

Catalyst concentration is generally expressed as ppm based on the weight of the product. The amount of catalyst will depend upon the activity of the particular DMC catalyst. For catalysts of lower activity, such as those useful in preparing low unsaturation polyols, relatively large amounts of catalyst such as 250 ppm to 1000 ppm may be necessary to achieve a substantial reaction rate under the process conditions chosen. With very active catalysts such as those disclosed in U.S. Pat. Nos. 5,470,813, 5,482,908, and 5,545,601, amounts from less than 5 ppm to 250 ppm or higher are useful, more preferably from about 15 ppm to about 150 ppm.

In a typical synthetic procedure, the reaction is begun by introducing the reactive unsaturation-containing, oxyalkylatable initiator into a reaction vessel suitable for polyoxyalkylation, with or without a solvent or organic suspending agent. The catalyst is then introduced, either alone or in admixture with further solvent, suspending agent, or other diluent. The reactor is sealed, flushed with nitrogen, heated to the desired temperature, and alkylene oxide added until a pressure of c.a. 10 psig is reached. The reactor pressure is monitored until an initial pressure drop signifies that the "induction period" characteristic of DMC catalysts is over, and the catalyst has been activated.

The oxyalkylation of the initiator may also take place with continuous addition of the initiator during the course of the reaction as disclosed in copending U.S. application Ser. No. 08/597,781, which is now U. S. Pat. No. 5,777,177, hereby incorporated by reference. For example, the initiator or initiators may be fed to the reactor continuously, either dissolved in alkylene oxide, dissolved in inert diluent, or, with liquid initiators, neat. The continuous addition of the initiator(s) may also be accompanied by continuous removal of product, resulting in a continuous stabilizer synthesis process, as disclosed in U.S. application Ser. No. 08/683, 356, which is now U.S. Pat. No. 5,689,012, also incorporated herein by reference.

The induction period may be lessened by use of DMC catalysts suitable for preparing ultra-low unsaturation polyoxyalkylene polyols, and by the use of preactivated catalyst. Once the catalyst has been activated, alkylene oxide or oxides (oxide(s)) are added in admixture and/or in sequence to prepare a product of desired structure and molecular weight. Further details of the oxyalkylation, purification, etc., may be had with reference to the aforementioned U.S. patents, which are incorporated, for this and other purposes, by reference. The oxyalkylation is continued until a product molecular weight of minimally about 2000 Da is obtained. More preferably, molecular weights in the range of 4000 Da to 15,000 Da, most preferably 4000 Da to 10,000 Da may be utilized for the subject polyol stabilizers. Molecular weights herein are expressed as number average molecular weights unless indicated otherwise.

The oxyalkylation of the reactive-unsaturation-containing molecule is optionally conducted in the presence of a vinyl polymerization inhibitor, preferably of the type which function without the presence of oxygen, since oxyalkylations are generally conducted "in vacuo", meaning in this case that virtually the entire reactor pressure is due to alkylene oxide; or in the presence of a gas inert to the process, e.g. argon, nitrogen, etc. In other words, the partial pressure of oxygen generally, is substantially zero. It is common to flush oxyalkylation reactors with nitrogen one or more times prior to final evacuation and introduction of alkylene oxide. Suitable inhibitors are well known to those skilled in the art of vinyl polymerization. Suitable inhibitors are, for example, 1,4-benzoquinone, 1,4-naphthoquinone, diphenylphenylhydrazine, $FeCl_3$, $CuCl_2$, sulfur, aniline, t-butyl-catechol, trinitrobenzene, nitrobenzene, chloranil, and the like. Benzoquinone is preferred.

The inhibitor should be used in an amount effective to inhibit polymerization of the reactive unsaturation-containing initiator. Thus, the amount will vary with the reactivity of the particular type of unsaturation. Molecules with acrylic-type unsaturation, for example, may require higher levels of inhibitor than less reactive unsaturation-containing initiators. The amount of inhibitor will also vary with oxyalkylation temperature, with higher temperatures requiring higher amounts of inhibitor. Amounts of inhibitor, in weight percent relative to the weight of the reactive-unsaturation-containing initiator, may vary, when used, from about 0.01 weight percent to about 5 weight percent, preferably from about 0.05 weight percent to about 1 weight percent, and more preferably from about 0.1 weight percent to about 0.5 weight percent. The latter range is particularly useful with 1,4-benzoquinone.

Following oxyalkylation, the product may be vacuum stripped, for example using a stream of nitrogen, to remove unreacted monomers and other volatile components. The product may also be filtered to remove traces of DMC catalysts or their residues or may be subjected to other methods of catalyst removal. When DMC catalysts of the ultra-low unsaturation-producing type are employed, the small amounts of catalysts may sometimes be left in the product, or the product may be subjected to simple filtration.

The polyoxyalkylated unsaturated di- or polycarboxylic acids may be used as such as polymer polyol stabilizers, or may be further modified by known techniques. For example, "preformed stabilizers" may be prepared by polymerizing a limited amount of one or more unsaturated monomers in the presence of the polyoxyalkylated unsaturated di- or polycarboxylic acid to form a reaction product containing a vinyl polymer solution or dispersion of low solids content as taught by U.S. Pat. No. 5,196,496.

The products described above may be used as is a polymer stabilizer in the preparation of polymer polyols by the in situ polymerization of one or more unsaturated monomers in a base polyol. However, further reaction products of these products may be used as well. For example, yet higher molecular weight stabilizers may be prepared by coupling two or more of the unsaturated di- or polycarboxylic acid-derived polyethers together using coupling agents capable of reacting with the terminal hydroxyl functionality of the molecules, or by coupling a single stabilizer with a conventional polyether, polyester, or polyetherester molecule containing no reactive unsaturation to produce a higher molecular weight, singly-unsaturated stabilizer or stabilizer precursor. Stabilizers having but a single site of reactive unsaturation are preferred. Examples of coupling agents are di- and polyisocyanates, as disclosed in U.S. Pat. No. 5,494,957; dicarboxylic acids, acid anhydrides, and acid halides which may be used to prepare diester-coupled products; or other bis-functional, hydroxyl-reactive molecules such as organic bis-cyanates, and the like.

By "further reaction product" is also meant a stabilizer prepared by employing the initial, polyoxyalkylated unsaturated di- or polycarboxylic acids as a reactant. The most preferred "further reaction product" are preformed stabilizers as disclosed in Simroth U.S. Pat. No. 5,196,476, previously discussed. The "preformed stabilizer" can be metered into the polyol reactor together with base polyol, further vinyl monomers, etc., to form a stable, low viscosity, high solids polymer polyol. Thus, the term "further reaction product" refers to any polymer stabilizer prepared from the DMC-catalyzed polyoxyalkylated unsaturated di- or polycarboxylic acid products of the subject invention. The further reaction may include capping, derivatization, coupling, or any other further processing which results in a product which is effective to stabilize a polymer polyol.

The stabilizers thus produced may be used to prepare polymer polyols by adding from less than about 0.001 mol to 0.3 mol, preferably 0.01 mol to about 0.1 mol of stabilizer per mol of "base" or "carrier" polyol. One or more vinyl monomers, e.g. acrylonitrile, styrene, acrylic acid, methylmethacrylate, methylacrylate, p-methylstyrene, α-methylstyrene, vinylchloride, vinylidene chloride, bromostyrene, and the like are added singly or in admixture, preferably dissolved in additional carrier polyol. The stabilizer may be supplied in admixture with further base polyol or in the vinyl monomer stream(s).

A vinyl polymerization initiator, e.g. an organic peroxide, hydroperoxide, peroxyester, azo compound, or the like is added, and polymerization commenced. The temperature should be adjusted to provide polymerization conditions suitable for the particular monomer/initiator combination.

Examples of suitable free radical polymerization initiators include acyl peroxides such as didecanoyl peroxide and dilauroyl peroxide, alkyl peroxides such as t-butylperoxy-2-ethylhexanoate, t-butylperpivalate, t-amylperoctoate, 2,5-dimethyl-hexane-2,5-di-per-2-ethylhexoate, t-butylperneodecanoate, t-butylperbenzoate and 1,1-dimethyl-3-hydroxybutylperoxy-2-ethylhexanoate, and azo catalysts such as azobis(isobutyronitrile), 2,2'-azo-bis-(2-methylbutyronitrile), and mixtures thereof. most preferred are the acyl peroxides of the above formula, and the azo catalysts.

The polymerization initiator concentration employed can be varied considerably. As a representative range, the concentration can vary from about 0.1 to about 5.0 weight percent or even more, based upon the total feed to the reactor. Up to a certain point, increases in the catalyst concentration result in increased monomer conversion; but further increases do not substantially increase conversion. The particular catalyst concentration selected will usually be an optimum value considering all factors, including costs. It has been determined that low concentrations can be used in conjunction with high potency performed stabilizers while still achieving stable polymer/polyols.

The polymer polyol preparation may be conducted in batch, semi-batch, and continuous processes. Following vinyl polymerization, any unreacted monomers are generally stripped from the product. The monomer-free product may be used as is, or may be filtered to remove any large particles which may have been created. Further reference to polymer polyol preparation may be made to U.S. Pat. Nos. 5,196,476; 4,148,840; 4,454,255; and 5,494,957, which are herein incorporated by reference.

In addition to use as stabilizers in polyether polymer polyol production, the reactive unsaturation-containing stabilizers of the subject invention may also be used for other products, for example, but not by limitation, to form impact modifiers, either ex situ or in situ. For example, preformed vinyl polymer impact modifiers may be prepared by reacting the reactive unsaturation-containing stabilizer with one or more polymerizable vinyl monomers such as those discussed previously, as well as multiply unsaturated monomers such as butadiene and the like. The polymerization may be affected neat, in solution in suitable solvent, or in ordinary or reverse emulsion in an aqueous system. The ex situ impact modifiers may be separated and blended into a polymer, e.g. polystyrene, polymethyl-methacrylate, polyesters, polyamides, and the like which are desired to be impact-toughened. Alternatively, the polymerization to form the polymer to be toughened may take place in the presence of the reactive unsaturation-containing impact modifier, to prepare an in situ toughened product. Impact toughened polystyrene, polyacrylonitrile, SAN, ABS, PVC, and the like may be toughened in this manner. An unexpected benefit of the subject process is that the reactive-unsaturation-containing polyethers of the subject invention are of low color, permitting their use with transparent and white thermoplastics without introducing undesired coloration.

By the term "well defined" as used herein is meant a composition of relatively predictable composition at the molecular level in view of the initiator used. The variation in oxypropylation, e.g. the polydispersity, should increase somewhat with increasing molecular weight, but should be relatively low, in the range of 1.0 to 3.0, more preferably in the range of 1.0 to about 2.5, and most preferably in the range of 1.0 to 1.5.

In the case of reactive unsaturation-containing molecules with two free carboxylic acid groups, e.g. fumaric acid, "well-defined" means that in the majority of molecules, the reactive unsaturation should be substantially centered within the polyetherester backbone, with the extended, hydroxyl group-terminated polyether chains exhibiting expected statistical variation in length. The product should contain less than 10 mol percent, and preferably, substantially no molecules containing two or more reactive unsaturation sites, unless a starter containing multiple sites is used. In other words, a bis-oxyalkylatable starter should result in a substantially bis-oxyalkylated product without extensive transesterification, Michael-addition reactions, other addition reactions across the site of unsaturation, etc.

Well defined products have hydroxyl functionalities close to that predicted based on the functionality of the initiator. A bis-oxyalkylatable initiator will result in a product bearing close to two hydroxyl groups per molecule. Specifically, for example, a stabilizer prepared by a process not in accord with the subject invention, for example by esterifying a reactive unsaturated dicarboxylic acid with either a conventional polyether polyol or with a DMC-catalyzed low unsaturation polyol, will not produce a well-defined product as that term is used herein. In a like vein, by the term "statistically similar" is meant, with respect to polyoxyalkylene polyether chains formed during preparation of the stabilizer, that the majority of such chains will be of similar length, with variations in length substantially that expected when preparing strictly hydroxyl functional polyoxyalkylene polyols employing DMC catalysts from similarly functional but saturated starter molecules. With ultra-low unsaturations producing DMC catalysts, this variation is small.

Conventional oxyalkylation with alkylene oxides in the presence of basic catalysts cannot be used to prepare the unique reactive unsaturation-containing stabilizers of the subject invention. The base-catalyzed oxyalkylation will introduce a considerable quantity of allyl group-containing oligomers of broad molecular weight range which will dilute the stabilizing ability of the subject stabilizers. Moreover, the various reactants, partial reaction products, etc., will also interact in the presence of the strong base, to produce a variety of transesterfications and side reactions which would lead to a variety of ill-defined chemical linkages. The less reactive allyl group may also later react, particularly by oxidation, to form colored byproducts.

The stabilizers of the subject invention are quantitatively different from those prepared by reaction of a hydroxyl-reactive, reactive unsaturation-containing monomer with a preformed polyether polyol. In particular, reaction of fumaric acid with a polyoxypropylene monol, e.g. polyoxypropylated n-butanol, will result in a fumarate-functional polyether with no hydroxyl functionality. Reaction of fumaric acid with a polyoxypropylene diol will result in a mixture containing both singly fumarate-functional as well as doubly, triply, etc. fumarate-functional products. Some of these products will be bis-hydroxyl functional, some will be bis-carboxylic acid functional, and some will contain both hydroxyl as well as carboxylic acid functionalities. The products, again, will not be well defined.

Initiators having two or more carboxylic acid groups per molecule should constitute the predominant population of molecules in the polyether stabilizer. It would not depart from the spirit of the invention to add minor quantities, i.e. less than 50 mol percent of other oxyalkylatable compounds such as hydroxypropyl-methacrylate, methacrylic acid, or the like.

The polyoxyalkylated unsaturated di- or polycarboxylic acids of the subject invention have an unsaturation less than about 0.020 meq/g, preferably less than 0.015 meq/g, and most preferably less than 0.010 meq/g. These unsaturations are the unsaturation which is produced during polyoxyalkylation, and is exclusive of the unsaturation present due to the unsaturated di- or polycarboxylic acid. The products have molecular weights in excess of 1500 Da, preferably in excess of 2000 Da, and more preferably about 4000 Da or higher. Molecular weights (number average) of about 6000 Da to 10,000 Da are believed to be most desirable in many applications.

Having generally described this invention, a further understanding can be obtained by reference to certain specific examples which are provided herein for purposes of illustration only and are not intended to be limiting unless otherwise specified.

EXAMPLE 1

A one-liter stirred reactor is charged with 20 g fumaric acid, 0.2 g of a double metal cyanide catalyst prepared in accordance with U.S. Pat. No. 5,545,601, and 100 g toluene. No radical inhibitor is added. The reactor is evacuated and the reaction mixture is heated up to 130° C. with stirring. Propylene oxide (18 g) is fed to the reactor. The initial pressure drops to 11 psig and additional propylene oxide (18 g) is fed to the reactor followed by a 20 minutes cookout. After the cookout, propylene oxide is fed into the reactor continuously at a rate of 3.3 g/min to a total of 659 g. After propylene oxide addition is complete, the mixture is held at 130° C. until a constant pressure is observed. Residual unreacted monomer and toluene are then stripped under vacuum at 130° C. from the product. The resulting product (650 g) has a viscosity of 1290 cps (25° C.). It has a hydroxyl number of 27.4 mg KOH/g and an unsaturation of 0.017 meq/g. Gel permeation chromatography gives a number average molecular weight of 3603 and a polydispersity (Mw/Mn) of 1.35. The proposed structure of a relatively uniformly bis-polyoxyalakylated fumarate diester is consistent with NMR and IR results.

EXAMPLE 2

Example 1 is repeated, but propylene oxide addition is continued until a molecular weight of 12,000 Da is obtained. The product stabilizer has a viscosity of 31,000 cps and a hydroxyl number of 10.6 mg KOH/g.

EXAMPLE 3

Example 1 is repeated, but a propylene oxide and ethylene oxide mixture if fed instead of only propylene oxide, and addition is continued until a molecular weight of 8,000 Da is obtained. The product has a viscosity of 4,080 cps, a hydroxyl number of 14.6 mg KOH/g and an unsaturation of 0.0075 meq/g. It contains 20 weight percent ethylene oxide units overall.

EXAMPLE 4

A polymer polyol is prepared by a continuous polymerization employing a well mixed reactor comprising a tank fitted with baffles and impeller. The feed components are pumped into the reactor continuously after traversing an in-line static mixer to assure complete mixing of the feed components before entering the reactor. The temperature of the reactor is controlled to within 1° C. The product flows out of the top of the reactor and into a second unagitated reactor also controlled within 1° C. The product then flows out of the top of the second reactor continuously through a back pressure regulator that has been adjusted to provide about 45 psig pressure in both reactors. The crude product flows through a cooler to a collection vessel. Percent by weight polymer in the polymer polyol is determined from analysis of the amount of unreacted monomers present in the crude product. The crude product is vacuum stripped to remove unreacted monomers and volatiles before testing.

The stabilizer utilized to prepare the polymer polyol is a preformed stabilizer prepared from the product of Example 3, by the process disclosed in U.S. Pat. No. 5,196,476. The base polyol is a double metal cyanide complex catalyzed, glycerine-initiated, polyoxypropylene/polyoxyethylene copolymer containing 20 weight percent of randomly distributed ethylene oxide, and having a hydroxyl number of approximately 14.6. The free radical polymerization initiator is azobisisobutyronitrile, which represents 0.53 weight percent of the total feed. The stabilizer is present at 3.3 weight percent relative to the weight of the base polyol, and isopropanol is used as a chain transfer agent at 4.5 weight percent relative to the total reactor feed. The vinyl monomers consist of acrylonitrile, styrene, and vinylidene chloride in a weight ratio of 30/64/6 and represents 38 weight percent of the total reactor feed. Polymer target solids weight is 40 weight percent. The reaction temperature was set at 115° C., and the flow rates adjusted to provide a residence time in the first reactor of 60 minutes. The product was found to have a viscosity of 5998 cks, a mean polymer particle size of 1.08 μm, and excellent filterability.

Having now fully described the invention, it will be apparent to one of ordinary skill in the art that many changes and modifications can be made thereto without departing from the spirit or scope of the invention as set forth herein.

What is claimed is:

1. In a process for the manufacture of a polymer polyol by the in situ polymerization of one or more unsaturated monomers in a base polyol in the presence of a polymer polyol stabilizer, the improvement comprising:

selecting as said polymer polyol stabilizer a double metal cyanide complex-catalyzed polyoxyalkylated unsaturated di- or polycarboxylic acid stabilizer product having a polyoxyalkylation-derived unsaturation of less than about 0.020 meq/g and a molecular weight of about 2000 Da or higher, or a further reaction product thereof.

2. The process of claim 1 wherein said unsaturated di- or polycarboxylic acid is selected from the group consisting of maleic acid, methyl maleic acid, fumaric acid, itaconic acid, and mixtures thereof.

3. The process of claim 1 wherein said unsaturated di- or polycarboxylic acid comprises fumaric acid.

4. The process of claim 1 wherein said further reaction product comprises a higher molecular weight stabilizer prepared by reacting said stabilizer product with one or more di- or polyisocyanates.

5. The process of claim 1 wherein said further reaction product comprises a higher molecular weight stabilizer prepared by esterifying said stabilizer product with a di- or polycarboxylic acid or acid halide or anhydride thereof.

6. The process of claim 1 wherein said further reaction product comprises a preformed stabilizer prepared by polymerizing one or more unsaturated monomers in the presence of said stabilizer product to form a preformed stabilizer having a low polymer solids content.

7. The process of claim 1 wherein said polymer stabilizer comprises a double metal cyanide complex-catalyzed polyoxyalkylated fumaric acid having a molecular weight of about 4000 Da or higher; a further reaction product thereof; or the admixture thereof with said further reaction product.

8. A process for the preparation of a well defined hydroxyl-functional and unsaturation-functional polyoxyalkylene polyether, said process comprising:

a) selecting an initiator molecule containing at least one site of carbon-carbon unsaturation, said initiator molecule having at least two free carboxylic acid groups oxyalkylatable by alkylene oxide in the presence of a double metal cyanide complex catalyst;

b) oxyalkylating said initiator molecule with one or more alkylene oxides in the presence of an effective amount of a double metal cyanide complex catalyst;

c) recovering a hydroxyl- and unsaturation-functional polyoxyalkylene polyether having not more than substantially one initiator molecule per molecule of polyether, and not more than about 0.020 meq/g unsaturation beyond that of initiator molecule-derived unsaturation.

9. The process of claim 8 wherein said oxyalkylation further takes place in the presence of an effective amount of an inhibitor which inhibits polymerization of unsaturated hydrocarbons.

10. The process of claim 9 wherein said inhibitor is one which functions in the absence of oxygen.

11. The process of claim 9 wherein said inhibitor is present in an amount of from about 0.01 weight percent to about 5 weight percent based on the weight of said initiator molecule.

12. The process of claim 9 wherein said inhibitor is present in an amount of from about 0.05 weight percent to about 1.0 weight percent based on the weight of said initiator molecule.

13. The process of claim 8 wherein said polyether contains less than about 0.010 meq/g unsaturation other than said initiator molecule-derived unsaturation.

14. The process of claim 8 wherein said oxyalkylation takes place in an aprotic solvent.

15. The process of claim 9 wherein said inhibitor comprises 1,4-benzoquinone.

16. The process of claim 8 wherein said initiator molecule comprises maleic acid, methylmaleic acid, fumaric acid, or itaconic acid.

17. A polymer polyol stabilizer or stabilizer precursor, comprising a polyether produced by the process of claim 8.

18. A polymer polyol stabilizer or stabilizer precursor, comprising a polyether produced by the process of claim 16.

19. An unsaturation-functional and hydroxyl-functional polyoxyalkylene polyether corresponding to the formula:

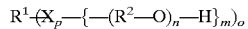

wherein $R^1$ is an optionally substituted hydrocarbon residue containing at least one ethylenic or ethylynic unsaturated carbon-carbon bond, said residue optionally containing interspersed heteroatoms, p is independently zero or one such that the polyoxyalkylene polyether contains at least two X groups $R^2$ is alkylene or substituted alkylene; X is a linking group selected from the group consisting of O, S, N, $NR^3$,

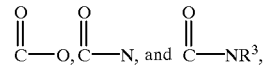

wherein o and p are selected such that at least two X are

groups; m is 1 when said linking group is O, S,

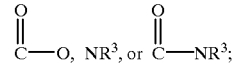

m is 2 when said linking group is N or

wherein o is from 2 to about 4, wherein n is such that the product of n×o is from about 10 to about 500, and wherein $R^3$ is $C_{1-8}$ alkyl, optionally substituted by halo, alkoxy, or cyano substituents.

20. The polyether of claim 19 wherein said polyether has a molecular weight of from about 2000 Da to about 15,000 Da.

21. The polyether of claim 19, wherein R is CH=CH, p is 1, o is 2, each X is

and said polyether has a molecular weight of from about 2000 Da to 15,000 Da.

22. A toughened, addition-polymerized thermoplastic prepared by polymerizing one or more unsaturated monomers in the presence of the polyether of claim 19.

23. A toughened thermoplastic, said toughened thermoplastic prepared by blending with a thermoplastic, the polymerized reaction product of a polyether of claim 19 with one or more polymerizable unsaturated monomers.

24. The process of claim 8 wherein the alkylene oxides are selected from the group consisting of ethylene oxide, propylene oxide, and mixtures thereof.

25. The polyether of claim 19 wherein said polyether contains less than 10 mol percent molecules containing two or more reactive unsaturation sites.

26. The polyether of claim 19 wherein said polyether contains substantially no molecules containing two or more reactive unsaturation sites.

27. The polyether of claim 19 wherein said polyether has a polydispersity in the range of 1.0 to 1.5.

28. The polyether of claim 19 wherein $R^2$ is selected from the group consisting of ethylene, propylene, and mixtures thereof.

* * * * *